US008923570B2

(12) United States Patent
Bennett et al.

(10) Patent No.: US 8,923,570 B2
(45) Date of Patent: Dec. 30, 2014

(54) AUTOMATED MEMORY BOOK CREATION (75) Inventors: Steven M. Bennett, Hillsboro, OR (US); Scott Robinson, Portland, OR (US); Vishakha Gupta, Beaverton, OR (US)

(73) Assignee: Intel Coporation, Santa Clara, CA (US)

( * ) Notice: Subject to any disclaimer, the term of this patent is extended or adjusted under 35 U.S.C. 154(b) by 165 days.

(21) Appl. No.: 13/527,327

(22) Filed: Jun. 19, 2012

(65) Prior Publication Data
US 2013/0336543 A1 Dec. 19, 2013

(51) Int. Cl.
G06K 9/00 (2006.01)
G06K 9/62 (2006.01)
G06K 9/54 (2006.01)

(52) U.S. Cl.
CPC .......... G06K 9/6267 (2013.01); G06K 9/00503 (2013.01)
USPC ............................ 382/112; 382/225; 382/305

(58) Field of Classification Search
CPC .......... G06K 9/00228; G06K 9/00677; G06K 9/00221; G06K 9/6217
USPC .......................................................... 382/112
See application file for complete search history.

(56) References Cited

U.S. PATENT DOCUMENTS

| 6,636,648 | B2 * | 10/2003 | Loui et al. ...................... 382/284 |
| 6,741,864 | B2 * | 5/2004 | Wilcock et al. ............. 455/456.1 |
| 6,847,733 | B2 * | 1/2005 | Savakis et al. ................. 382/225 |
| 7,467,222 | B2 * | 12/2008 | Kacker .......................... 709/232 |
| 7,756,334 | B2 * | 7/2010 | Kim et al. ...................... 382/181 |
| 7,983,442 | B2 | 7/2011 | Chiang et al. |
| 8,121,358 | B2 * | 2/2012 | Weng et al. .................... 382/118 |
| 8,423,916 | B2 * | 4/2013 | Chihara et al. ................ 715/863 |
| 2003/0198390 | A1 * | 10/2003 | Loui et al. ...................... 382/224 |
| 2007/0038938 | A1 | 2/2007 | Canora et al. |
| 2011/0206284 | A1 | 8/2011 | Das et al. |
| 2012/0054691 | A1 * | 3/2012 | Nurmi ........................... 715/854 |
| 2012/0087548 | A1 * | 4/2012 | Wu et al. ....................... 382/115 |
| 2012/0117473 | A1 * | 5/2012 | Han et al. ...................... 715/723 |

FOREIGN PATENT DOCUMENTS

JP 2011238043 A 11/2011

OTHER PUBLICATIONS

Ming Zhao, Yong Wei Teo, Siliang Liu, Tat-Seng Chua, Ramesh Jain, "Automatic Person Annotation of Family Photo Album", Image and Video Retrieval Lecture Notes in Computer Science vol. 4071, 2006, pp. 163-172.*

(Continued)

*Primary Examiner* — Utpal Shah
(74) *Attorney, Agent, or Firm* — Schwegman Lundberg & Woessner, P.A.

(57) ABSTRACT

Embodiments of a system and method for automatic creation of a multimedia presentation or highlight collection from a collection of candidate contents are generally described herein. In some embodiments, each one of a plurality of videos or images in the candidate contents are automatically evaluated for quality, content, metadata, and desirability based on user specified inclusion factors. Inclusion factors may be utilized to generate one or more scores for the candidate contents, which provide for automatic ranking of the candidate contents. Based on scores generated from the selected inclusion factor criteria a highlight collection of images is automatically generated. The highlight collection can be included in a multimedia presentation, in the form of a memory book, slideshow, or digital narrative, and can be automatically generated from the plurality of videos or images.

18 Claims, 7 Drawing Sheets

(56) References Cited

OTHER PUBLICATIONS

Stone, Z.; Zickler, T.; Darrell, T., "Autotagging Facebook: Social network context improves photo annotation," Computer Vision and Pattern Recognition Workshops, 2008. CVPRW '08. IEEE Computer Society Conference on , vol., No., pp. 1,8, Jun. 23-28, 2008.*

Das, M.; Loui, A.C., "Automatic face-based image grouping for albuming," Systems, Man and Cybernetics, 2003. IEEE International Conference on , vol. 4, No., pp. 3726, 3731 vol. 4, Oct. 5-8, 2003.*

Jae Young Choi; De Neve, W.; Plataniotis, K.N.; Yong-Man Ro, "Collaborative Face Recognition for Improved Face Annotation in Personal Photo Collections Shared on Online Social Networks," Multimedia, IEEE Transactions on , vol. 13, No. 1, pp. 14, 28, Feb. 2011.*

"International Application Serial No. PCT/US2013/046353, International Search Report mailed Oct. 18, 2013", 3 pgs.

"International Application Serial No. PCT/US2013/046353, Written Opinion mailed Oct. 18, 2013", 6 pgs.

Snavely, Noah, "Photo Tourism: Exploring Photo Collections in 3D", ACM Transactions on Graphics, 25(3), [Online]. Retrieved from the Internet: <URL: http://research.microsoft.com/en-us/um/redmond/groups/ivm/phototours/PhotoTourism.pdf>, (Aug. 2006), 11 pgs.

* cited by examiner

| Image ID: ######## | Data Type | Value |
|---|---|---|
| Exposure | Float | #.# |
| Sharpness | Float | #.# |
| Location | Lat./Lon. | ###.#/###.# |
| Time/Date | Date | ##:##/##-##-## |
| People Present | Bool. | T/F |
| Number of People | Int. | # |
| Facial Recognition | Bool | T/F |
| Importance of Individuals | Int. | # |
| Individual Identity | Text | alpha. |
| Score | Float | ####### |

AUTOMATED MEMORY BOOK CREATION

BACKGROUND

The general availability of digital media capture tools such as digital cameras, video recorders, audio recorders, and smart phones equipped with one or more of these features, in combination with low-cost digital storage devices, has enabled individuals to quickly amass large collections of digital media. Often, users of these tools would like to share portions of these large media collections with others easily using an efficient presentation. For example, an individual may want to share digital video or digital photographs from a vacation with family or friends. In order to do so efficiently, the individual is faced with the challenge of selecting or boiling down a potentially large collection of video or photographs into a curated or representative summary that includes highlights or important features of the vacation. This manual process can be laborious and time consuming, but is often necessary to cull low quality or duplicative content.

Some tools for digital media organization can arrange groups of images or videos by date, name, or other embedded metadata fields. However, when preparing a slideshow or selecting highlights from a large collection of digital media, a user typically needs to manually select which images or videos from the entire collection will be included in a highlight presentation based on their content, appearance or visual attractiveness. An example of automating the creation of customized multimedia content is described in U.S. Patent Publication No. 2007/0038938. Alternative tools may display a random selection of images, for example as a slide show or screen saver configured to display images from a folder or directory selected by the user.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF THE EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
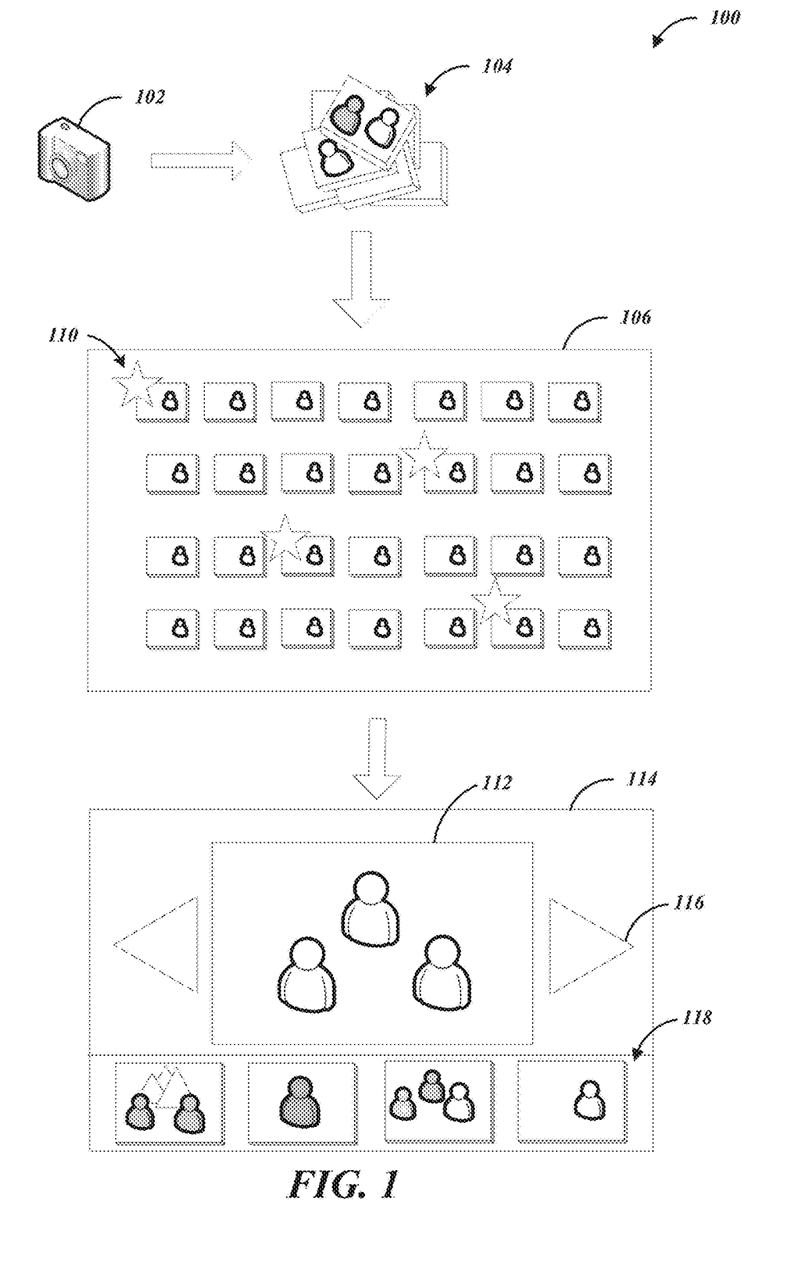
FIG. 1 is a flow diagram illustrating an example scheme for automatically creating a highlight collection from a plurality of multimedia documents, according to an embodiment.

FIG. 1 is a flow diagram illustrating an example scheme 100 for automatically creating a highlight collection from a plurality of multimedia documents, for example digital images, photographs or videos. In an example, a user may utilize an image capture device 102, such as a digital camera, smart phone or video recorder, to create a group of candidate images 104. The candidate images 104 may include digital photographs, digital videos, analog photographs that have been digitized, or any other depiction on an image-carrying medium that may be automatically inspected.

A user may gather the candidate images 104 into an initial collection set 106. The initial collection set 106 may include one or more groups, folders, sets, or portfolios of images, photographs, videos, and the like. The initial collection set 106 may be stored, inspected, and scored locally on a user's computer, remotely in a server, a cloud-based database, or on-line storage facility. Examples of Internet-based image storage facilities may include image hosting websites such as Photosynth®, Flickr®, Facebook®, SmugMug®, Picasa®, or any other image repository capable of storing digital media.

A user may manually tag or designate a sub-group 110 of the initial collection set 106 or videos gathered from the candidate images 104 for inclusion in any resulting collection that is produced by an automated system. Similarly, a user may manually tag or designate one or more images in the initial collection set 106 for inclusion or exclusion from any resulting collection that is produced by an automated system.

An example embodiment may automatically inspect each of the images in the initial collection set 106 for any of a plurality of inclusion factors. An inclusion factor is any criteria upon which an image, video clip, or other media may be evaluated. The inclusion factors may be combined or weighted to produce a score for each of the photo or video candidate images 104. Based on the resulting score, a subset of the group of candidate photos or videos may be included in the highlight collection 114. A highlight collection may be any group of images, videos, or other media that are selected as being representative of the initial collection set 106, or those images, videos or other media that are the most desirable based on user provided input, or of the highest image quality, based for example on appearance, in the initial collection set 106. The highlight collection 114 may be presented in a slideshow format that includes at least one featured image 112, a navigation mechanism 116, and a preview section 118 that includes some or all of the individual images in the highlight collection 114. The highlight collection 114 may be stored or presented in any of a variety of formats, including but not limited to, a slideshow, a presentation, a memory book, a composite video, a multimedia presentation, or an on-line portfolio.

In an example, a memory book, such as a supplemented presentation, may include presentation elements other than the candidate images 104 in the highlight collection 114. For example, text, maps, titles, music, narration that may be provided by a user for inclusion in the memory book. For example, additional presentation elements may be automatically obtained from a secondary source such as a collection of images that depict the location of where the candidate images 104 were captured. The secondary source may include a database of images, clip art, sounds, music, video, or maps, for example. In an example, additional presentation elements may be automatically obtained from a secondary source containing statistical or other factual information related to a geographic location embedded in the images.

Inclusion factors, which may be utilized for generating image scores, may include one or more evaluation techniques that may indicate the quality, importance, or uniqueness of individual photos or videos. For example, a facial detection process may be applied to each candidate image 104 to determine if a human face is present in an image. If a human face is detected, a facial recognition processes may be applied to attempt to identify the individual person in the image. The number of individuals in an image, the importance of an indentified individual in an image, or the frequency with which images of an individual person appears in the entire group of candidate images 104 may also be incorporated into the selection of photos or videos as inclusion factors.

Figure 2:
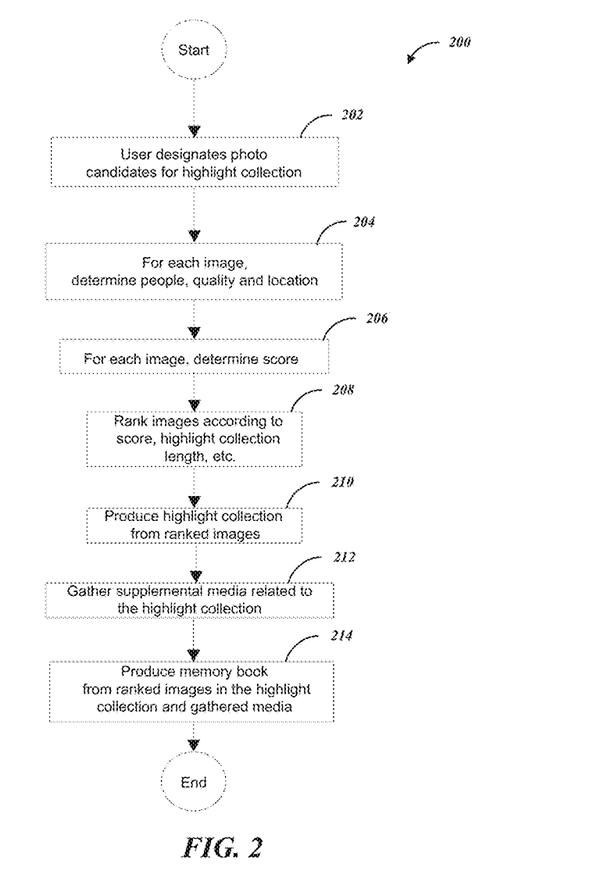
FIG. 2 is a flow diagram illustrating an example scheme for automatically creating a memory book that includes a highlight collection of images from a plurality of candidate images or videos, according to an embodiment.

FIG. 2 is a flow diagram illustrating an example scheme 200 for automatically creating a memory book that includes highlight collection of images from a plurality of candidate images or videos. At 202, a user may designate a plurality of photo candidates to be automatically inspected for inclusion in the creation of a highlight collection. Typically, a user will desire a highlight collection that includes visually desirable images and excludes visually undesirable images. The desirability of individual images may be based on subjective user-supplied factors, or objective image analysis. For example, a user may select a file folder on the user's personal computer containing all of the photographs from an event such as a family vacation. The user may desire objectively desirable images that are properly exposed and in focus. The user may also desire subjectively desirable images that include the user's family members. Instead of having to curate (e.g., sort, review, and select the best images) the collection of family vacation photographs, an example embodiment may automatically inspect the contents of the selected file folder, apply the user-selected inclusion factors, and present the most subjectively and objectively desirable images to the user in the form of a highlight collection.

At 204, each image from the plurality of photo candidates is examined to determine the presence or absence of people, the quality of the image, and, if possible, the location where the image was obtained. For example, a facial recognition process may be utilized to determine if one or more people are depicted in each individual image. In an example where a user has supplied photographs from a family vacation, an example embodiment may automatically determine which photographs include members of the user's family. An example embodiment may automatically evaluate the image quality of each image, for example the exposure, clarity, color balance, and focus of the image can be measured with an image analysis tool. An example embodiment may automatically determine each geographic location that was captured in the photographs, and flag for potential inclusion at least one image from each geographic location. Additionally, each image that includes geographic location information may be grouped with any of the other images that include similar geographic location information.

At 206, a score is determined and assigned to each image. Images may be scored based on the quality of the image depicted, or on the content, e.g., person(s) or place(s), depicted in the images. For example, images that are blurry, out of focus, under exposed, over exposed, or otherwise undesirable as determined by any other image evaluation techniques, may be assigned a low score or excluded from inclusion in a highlight collection. Images may be scored on more than one inclusion factor, where each inclusion factor is assigned a separate score that may be stored in a tabular format, for example. Images that are scored on multiple inclusion factors may be assigned a single composite score based on a weighting criteria that prioritizes the individual inclusion factors and is used to generate a single composite score for each image.

Images may be scored on the presence or number of individuals in the image, the importance of an indentified individual in an image, or the frequency with which images of an individual person appear in the entire group of candidate images. The relative importance of one individual in comparison to other persons in a group of candidate images may be based on the number of occurrences of an individual in the entire group of candidate images. The relative importance of individuals may also based on input from a user indicating that images with one or more specific individuals should be preferred over images without those individuals. Images that include important individuals, or images that uniquely depict a single individual, may be assigned scores that are higher than other images.

Alternatively, or in addition to selecting preferred individuals, a user may indicate that images with one or more individuals should receive a reduced score or be excluded from inclusion in the highlight collection or memory book. Images may also be scored on the presence or number of animals (e.g., pets, wildlife, etc.), possessions, landmarks, or any other recognizable object that may be specified by the user.

At 208, the plurality of photo candidates may be ranked according to the score assigned to each image, and the number of images desired for the highlight collection. For example, a user may specify a threshold number of images that should be included in the highlight collection. The threshold number may be a minimum or maximum number of desired images in the highlight collection. Based on the desired number of images and the score assigned to the images, at 210, the resulting highlight collection may be automatically produced.

If the user has indicated that supplemental media content should be added to the highlight collection, at 212, supplemental media can be retrieved from local or remote sources. For example, if geographic information is included with the images selected for the highlight collection, maps of the geographic location may be retrieved from a map database and included with the highlight collection in a memory book.

At 214, the highlight collection may then be viewed, stored, or published as a standalone collection, or combined with additional media, such as text information, maps, images, music, text, or video into a memory book. In an example, the resulting memory book may contain the automatically selected highlight images as well as the supplemental media that provides additional content related to the images in the highlight collection.

Figure 3:
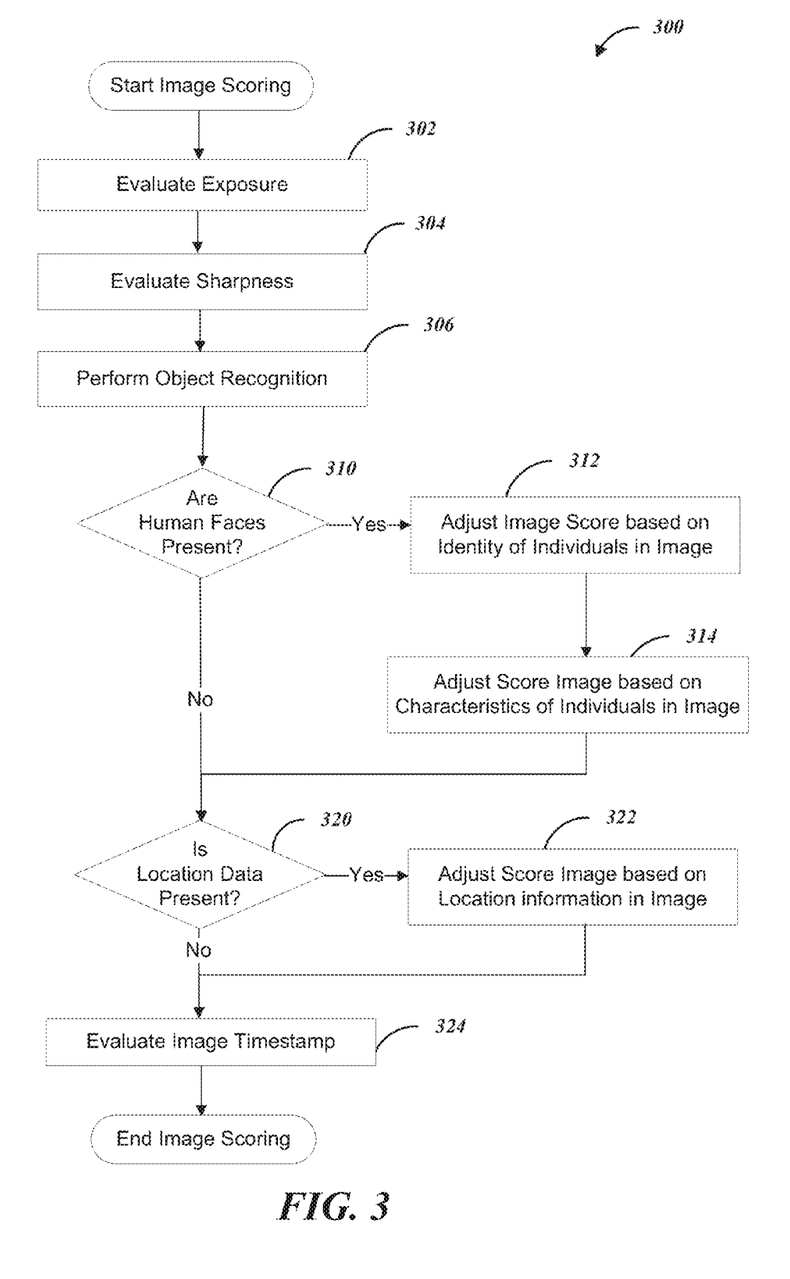
FIG. 3 is a flow diagram illustrating an example scheme for scoring multimedia images, according to an embodiment.

FIG. 3 is a flow diagram illustrating an example scheme 300 for scoring multimedia images. At 302, exposure analysis may be performed on each image and a resulting score indicating the exposure quality of each image may be assigned to each image. For example, a histogram analysis of each image may provide an indication of whether or not an image is over exposed, under exposed, or evenly exposed. A better or higher score may be assigned to images that are evenly exposed, thereby reducing the possibility of improperly exposed images from being included in a final highlight collection.

At 304, a sharpness analysis may be performed on each image. A resulting score indicating the quality of sharpness that may include the focus or blurriness attributes of each image may be assigned to each image. For example, a sharpness analysis may provide an indication of whether or not an image is out of focus, blurred by an object being in motion in the image, blurred by image-capture-device motion during the image capture, or a clear/sharp exposure that is in focus. A better or higher score being assigned to those images that are in focus, clear, and sharp, thereby reducing the possibility of blurry images being included in a final highlight collection.

At 306, any of a plurality of object recognition procedures may be performed on each image. In an example, each image may be analyzed for common or known shapes that may indicate the presence of objects that may be categorized, such as people, landmarks, buildings, automobiles, animals, and the like. For example, facial recognition may be performed on each image and a resulting score adjustment based on the presence or absence of human faces in the image. At 310, if human faces are identified, additional analysis of the image may be performed on the image to provide identification of one or more individuals in an image.

At 312, an image score may be determined or adjusted based on the identity of one or more individuals in an image through the use of facial recognition processes to determine the identity of individuals in the image. Facial recognition may include the use of a database of known individuals, such a collection of images from a social network, or a locally compiled database of images where individuals are pre-identified. An image score may be calculated or adjusted based on the frequency with which an individual appears in a set of images that are being analyzed, or the frequency in which images of the individual appears in a user's social network or local collection of images.

For example, if an individually appears in only one image in the set of images being analyzed, but appears frequently in images or videos contained in the user's social network or local collection of images, the one image with that individual may receive a higher score than images without that individual. This example illustrates a scenario where a close friend or family member of the user is depicted in only a single image in a collection of candidate images. Because of an inferred closeness of connection to the user (e.g., the individual is important to the user), based on the frequency of images of that individual the user's social network and low number of images of the individual in the collection of candidate images, an example embodiment may prioritize inclusion of the image with the individual in any resulting highlight collection.

An image containing a single depiction of an individual in an entire set of candidate collection images may be tagged or flagged as being a unique image because it is the only image in the set with the depicted individual. A unique image may be included in a resulting collection regardless of other image attributes, unless the user has indicated that the unique image or images depicting the individual should be excluded.

At 314, facial feature analysis may also be applied to individual images where human persons are detected as being present to determine one or more characteristics of the individuals in the image. For example, an image where all or a majority of the individuals in one image have their eyes open may receive a higher score than a similar image where one or more individuals were photographed with their eyes closed. Similar techniques may be applied to evaluate and score other image characteristics such as the presence of a red-eye effect induced by a camera flash, whether one or more individuals were looking towards or away from the camera when an image was captured, or any other physical attribute of an individual that may be determined through image analysis.

At 320, an image may be evaluated for location data that may be present in the image. Location information may be acquired from global positioning system (GPS) information (e.g., latitude and longitude data) embedded in the digital media containing the image, or through geographic recognition of a location, monument, locale, building, structure, bridge, street signs, store fronts, or any other feature(s) in a photograph or video provided by a location analysis module. Location information may be acquired from metadata embedded in the digital media. Location metadata may include any of a variety of location details, including but not limited to, an address, map coordinates, a city, a county, a region, a state, a country, or the like.

At 322, an image score may be determined or adjusted based on the location information contained in or derived from an image. Image location scores may be based on the number of images in a set that depict a common or unique location. For example, in a collection of images where the majority of the images were acquired at a first location and a relatively small number of images were acquired at a second location, the score of the images from the second location may be adjusted higher than the images of the first location. In this manner the greater the rarity of a location depicted in an image, the more likely that image will be selected for inclusion in a highlight collection. In an example where the location information in a collection of images is evenly distributed among a plurality of locations, one image from each location may be selected for inclusion in a highlight collection in order to ensure that each location is depicted in the resulting highlight collection.

In an example, location information may be utilized to automatically construct a map of locations where one or more videos or images were acquired. For example, a map including markers indicating where a sequence of images or videos were acquired may be included to provide a guide or narrative accompanying the presentation of a series of individual images in the highlight collection.

At 324, an image score may be determined or adjusted based on the timestamp information contained in or derived from an image. Image timestamp scores may be based on the number of images in a set that have a common, or alternatively unique, time or date value. For example, in a collection of images where the majority of the images were acquired on a first day and a relatively small number of images were acquired on a second day, the score of the images from the second day may be adjusted higher than the images acquired on the first day. In this manner the greater the rarity of a date or time when an image was acquired, the more likely that image will be selected for inclusion in a highlight collection. In an example where the location information in a set of images is evenly distributed among a timeline, one image from periodic intervals may be selected for inclusion in a collection in order to ensure that each time period is depicted in the resulting collection. Time periods for inclusion of images may be adjusted in response to the range of time over which each of the images in a candidate collection was acquired.

For example, a single image from one date may be given a higher score than each of a plurality of images for a different date such that the single image from the one date is more likely to be included in a final highlight collection as it represents the only image captured on that date. Similarly, if a collection of images was acquired within a narrow time period (e.g., a few hours), then the time period for including representative images may be as short as a few minutes depending on the number of desirable images in a resulting final collection.

Figure 4:
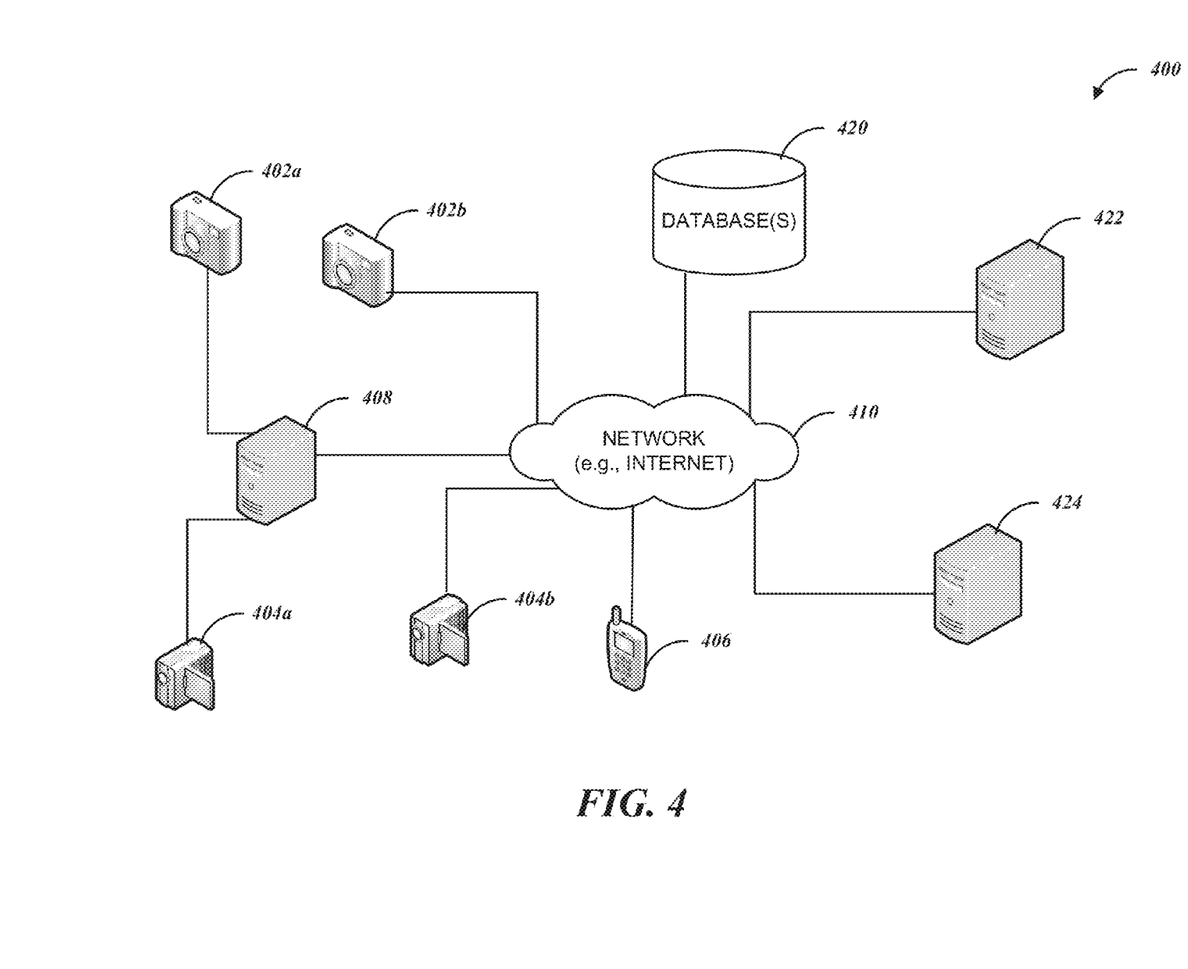
FIG. 4 is a block diagram illustrating an example of a network configuration upon which any one or more of the techniques discussed herein may be performed.

FIG. 4 is a block diagram illustrating an example of a network configuration 400 upon which any one or more of the techniques discussed herein may be performed. A user may utilize any of a variety of image capture devices such as a digital camera 402a, video recorder 404a, or camera-equipped smart phone 406. Video capture devices may be coupled to a user's personal computer 408 or coupled directly to a network 410, such as the Internet. For example digital camera 402b or video recorder 404b may interface directly with network 410 to upload images to an image database 420. Captured images may be stored in a non-volatile memory in the user's personal computer 408 or in an image database 420 coupled to network 410. The image database 420 may be contained on public or private server, or any other appropriate computing platform capable of storing digital media.

In an example, a user's personal computer 408 may be coupled to a social network 422 or a publishing server 424 through the network 410. A social network may be utilized as a reference by a facial recognition module. The facial recognition module may reference images that included identified individuals on the social network 422 as a source of data to weigh the importance of any individual identified in a candidate image.

A publishing server 424 may be utilized as a source of publically available images or as a publishing medium to store and provide access to a completed memory book or highlight presentation. For example, images depicting one or more locations in a user's set of candidate images may be acquired, (e.g., downloaded from the Internet) and presented to a user for selection of background images or title pages in combination with the user's own images. The publishing server 424 may be configured to provide public or private (e.g., password protected) access to a user's images as a collection or a completed highlight presentation.

Figure 5:
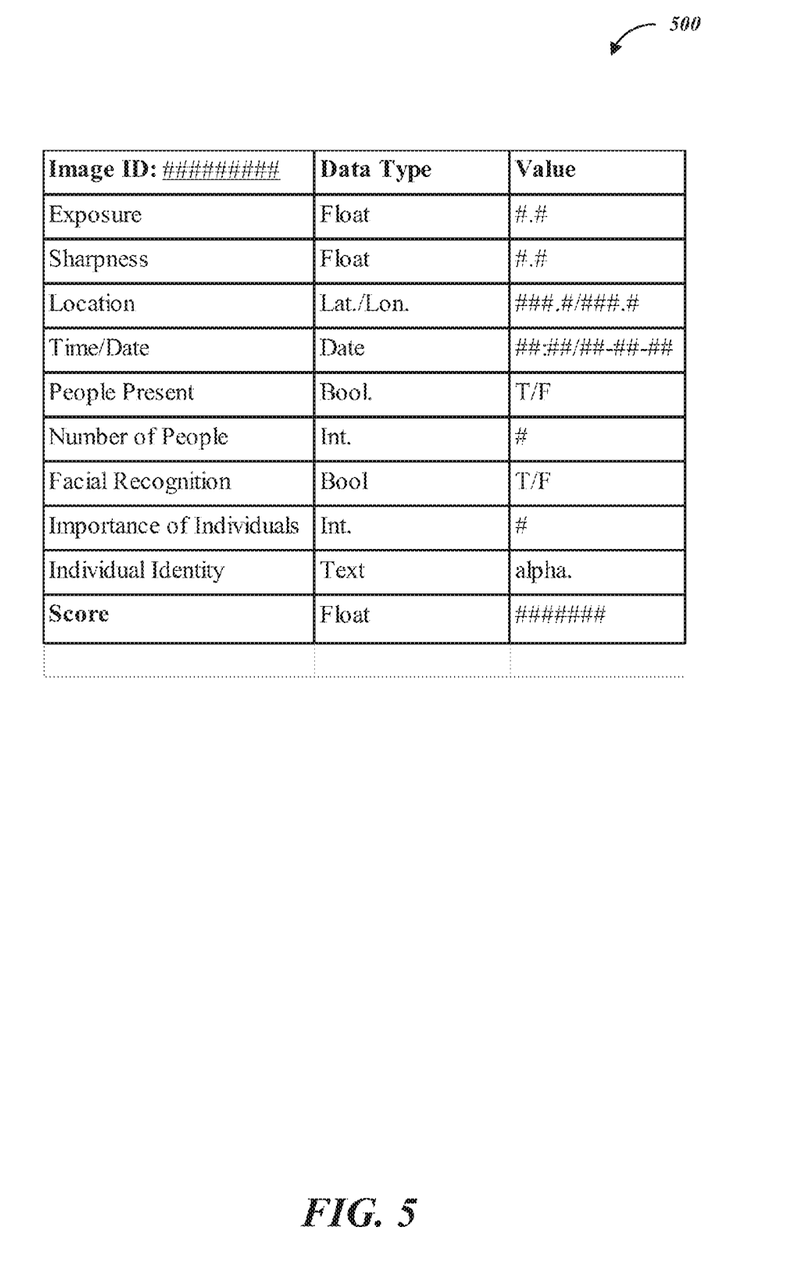
FIG. 5 is a table illustrating an example of a data structure that may be utilized to store image score data, according to an embodiment.

FIG. 5 is a table 500 illustrating an example of a data structure that may be utilized to store image score data. A record of scoring data may be compiled for each individual image in a collection. Each record may include a plurality of inclusion factor component scores. For example, a record may include a numeric score representing the quality of the image exposure, a numeric score representing the quality of the image sharpness, location information, date or time information, a Boolean flag indicating the presence or absence of people in the image, a numeric count of the number of individual persons in the image, and textual information identifying one or more individuals in the image. A single composite score may be calculated based on the content of each inclusion factor component score.

Alternatively, each image may be assigned only a single numeric score that may be adjusted in response to the presence or absence of inclusion factors. For example, each image in a collection may be assigned an initial score of fifty on a scale from zero to one-hundred. As each inclusion factor is evaluated the individual score maybe increased or decreased. A poorly exposed and blurry photograph that does not include any recognizable individuals may have its initial score reduced by ten units for each of the three factors, resulting in a final score of twenty. A properly exposed, sharp photograph of an individual who is a member of a user's social network may receive ten positive score units for each of these three factors, resulting in a final score of eighty.

In an example, a graphical user interface may be presented to a user, thereby allowing that user to specify a priority or weight to one or more inclusion factors. For example, a user may be able to specify if images that contain human faces are more important than images where no humans are depicted. Similarly, a user may be able to specify whether geographical location of where the images were captures is more or less important than including images with a wide range of timestamp data.

In an example, selection of individual images for inclusion in a highlight collection may be based on an absolute score criteria or on a quota indicating a percentage or number of images from the candidate group that should be included. A user may edit, append, delete, or otherwise modify any resulting collection of images that is automatically generated. For example, a user may review a highlight collection and add or remove one or more images from the collection prior to publication of the collection.

Figure 6:
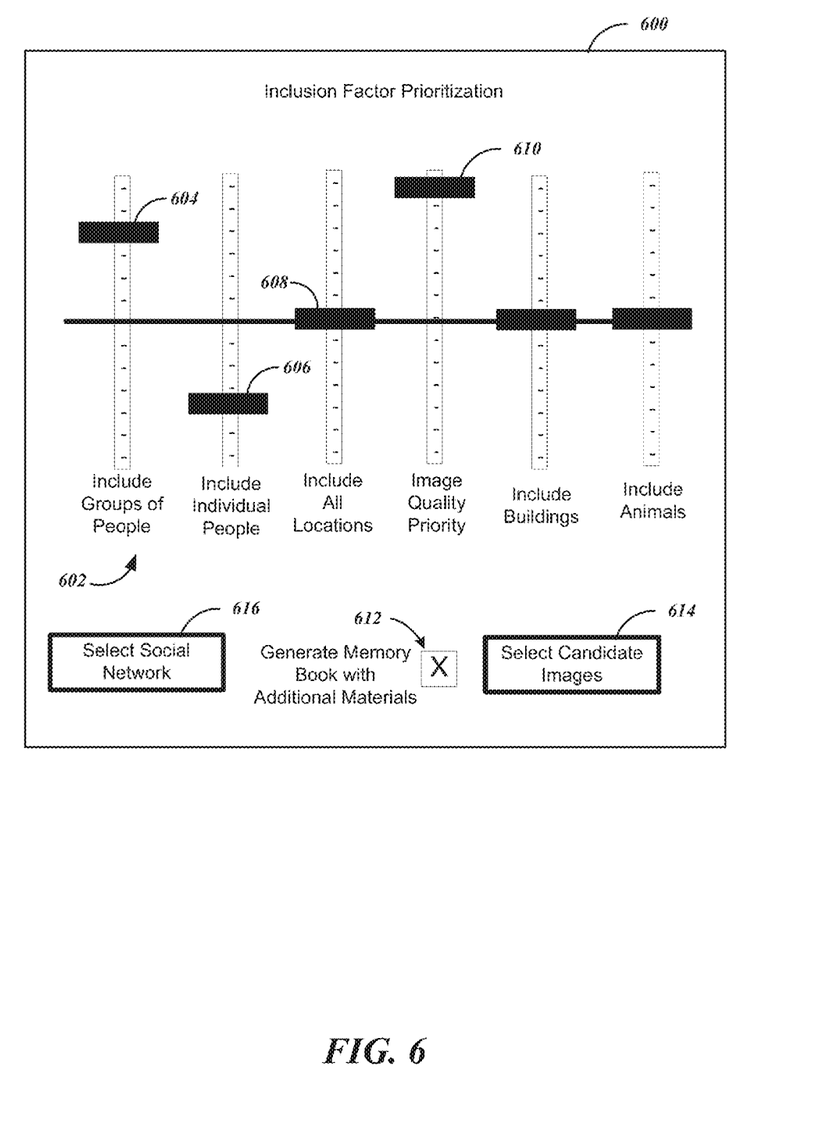
FIG. 6 is a block diagram illustrating an example of a user interface for prioritizing inclusion factors.

FIG. 6 is a block diagram illustrating an example of a user interface 600 for prioritizing inclusion factors 602. Any of a variety of inclusion factors 602 may be selected and prioritized by a user interacting with user interface 600. For example, a user may wish to prioritize images that include groups of people, but not images of individual people. A user may adjust a slider 604 upwards to increase the priority of the groups of people inclusion factor, and adjust slider 606 downward to decrease the priority of images with individual people. A user that is indifferent to the geographic location of the images may leave slider 608 centered in a neutral position that neither over weights or under weights the inclusion of all locations where images were acquired. A user that wants to include only images that have high quality scores may adjust slider 610 to a top position indicating a desire for the automatic inclusion of images in any resulting highlight collection that have, for example, good exposure and clarity. The user interface 600 may include any other, or a greater or lesser number of, inclusion factors that those depicted in the exemplary illustration of FIG. 6.

Upon the selection of the desire prioritization of the inclusion factors a user may mark a checkbox 612 indicating that additional related media, materials, or other information should be retrieved, and included with an automatically selected highlight collection to generate a memory book. If checkbox 612 is not marked, then only a highlight collection of images will be provided to the user. The highlight collection can be presented as a slideshow of the individual images, packaged into a single presentation format, a compressed file containing the highlight collection images, or any other desired format. The user may select button 614 to select candidate images and begin the automatic generation of a highlight collection. The user may select social network button 616 to select whether a social network, or alternatively a local image database, should be utilized to identify individuals in the individual images.

Figure 7:
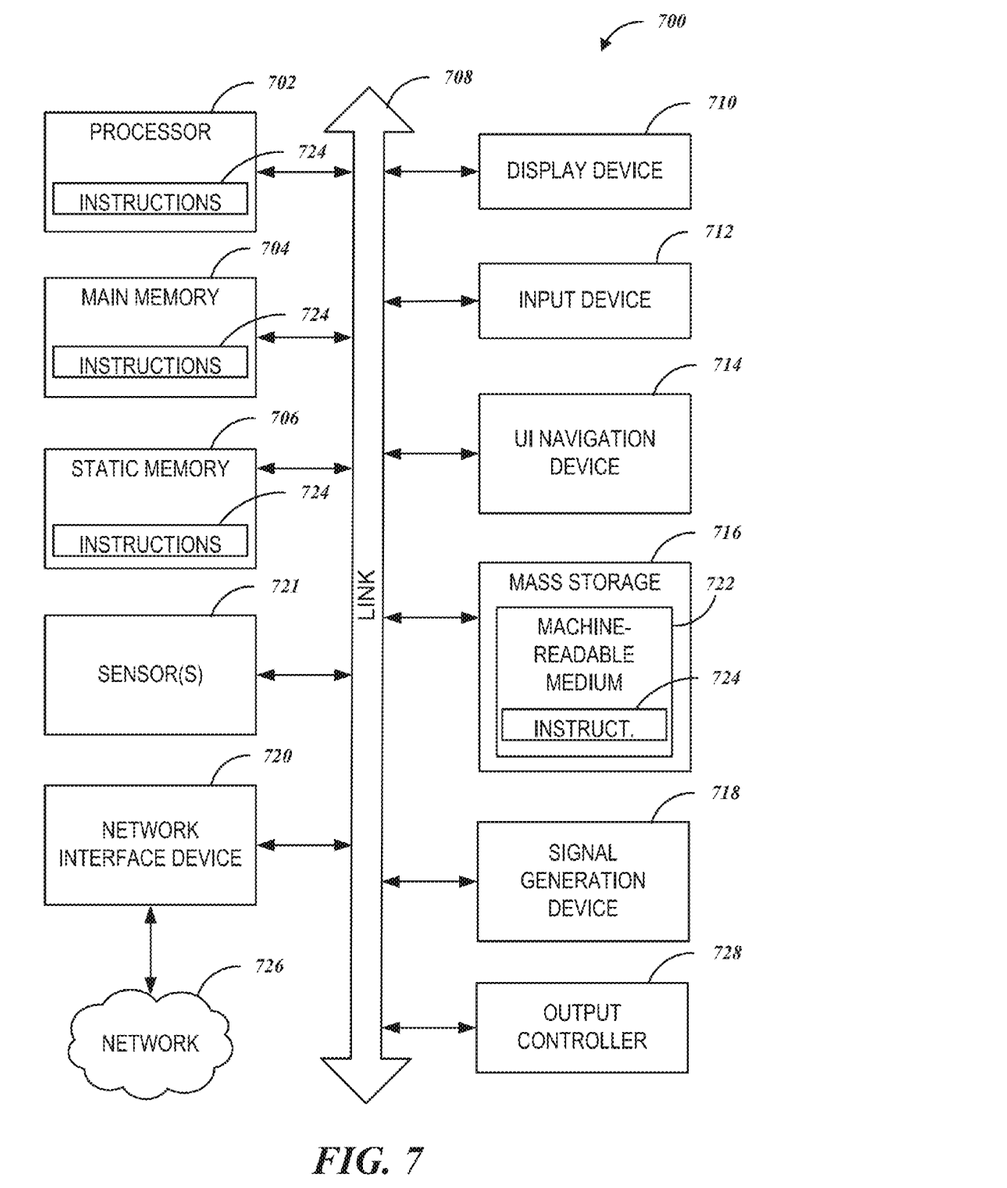
FIG. 7 is a block diagram illustrating an example machine upon which any one or more of the techniques discussed herein may be performed.

FIG. 7 illustrates a block diagram of an example machine 700 upon which any one or more of the techniques (e.g., methodologies) discussed herein may be performed. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 700 may include a hardware processor 702 (e.g., a processing unit, a graphics processing unit (GPU), a hardware processor core, or any combination thereof), a main memory 704, and a static memory 706, some or all of which may communicate with each other via a link 708 (e.g., a bus, link, interconnect, or the like). The machine 700 may further include a display device 710, an input device 712 (e.g., a keyboard), and a user interface (UI) navigation device 714 (e.g., a mouse). In an example, the display device 710, input device 712, and UI navigation device 714 may be a touch screen display. The machine 700 may additionally include a mass storage (e.g., drive unit) 716, a signal generation device 718 (e.g., a speaker), a network interface device 720, and one or more sensors 721, such as a global positioning system (GPS) sensor, camera, video recorder, compass, accelerometer, or other sensor. The machine 700 may include an output controller 728, such as a serial (e.g., universal serial bus (USB), parallel, or other wired or wireless (e.g., infrared (IR)) connection to communicate or control one or more peripheral devices (e.g., a printer, card reader, etc.).

The mass storage 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the mass storage 716 may constitute machine-readable media.

While the machine-readable medium 722 is illustrated as a single medium, the term "machine-readable medium" may include a single medium or multiple media (e.g., a centralized or distributed database, and/or associated caches and servers) that configured to store the one or more instructions 724. The term "machine-readable medium" may include any tangible medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

VARIOUS NOTES & EXAMPLES

Example 1 may include subject matter (such as an apparatus, a method, a means for performing acts, or a machine-readable medium including instructions that, when performed by the machine, that may cause the machine to perform acts), such as may include a plurality of instructions that in response to being executed on a computing device, cause the computing device to: receive a plurality of images; inspect each one of the plurality of images for a plurality of inclusion factors; determine a score for each one of the plurality of images based on the plurality of inclusion factors; rank the plurality of images according to the score determined for each one of the plurality of images; and generate the highlight collection including a subset of the plurality of images based on a criteria associated with the ranking of the plurality of images.

Example 2 may include or may optionally be combined with the subject matter of Example 1, to optionally include instructions to determine an identity of at least one human being in at least one of the plurality of images.

Example 3 may include or may optionally be combined with the subject matter of Examples 1 or 2, to optionally include instructions to evaluate a level of importance of the at least one human being identified in the at least one of the plurality of images.

Example 4 may include or may optionally be combined with the subject matter of Examples 1, 2 or 3, to optionally include wherein the level of importance is based on a presence of the identified human being in a social network or a local database of images.

Example 5 may include or may optionally be combined with the subject matter of Examples 1, 2, 3 or 4, to optionally include wherein the level of importance is based on a frequency with which the identified human being appears in the plurality of images.

Example 6 may include, or may optionally be combined with the subject matter of Examples 1 through 5, to optionally include instructions to provide a user interface to accept input from a user indicating the priority of the plurality of inclusion factors.

Example 7 may include, or may optionally be combined with the subject matter of Examples 1 through 6, to optionally include the plurality of inclusion factors comprising at least two of: a sharpness quality of an image; an exposure quality of an image; a presence of a human being in an image; a presence of an animal in an image; a quantity of human beings in an image; an importance of a human being in an image; a geographic location depicted in the image; a geographic location data embedded in an image; or an image metadata value.

Example 8 may include, or may optionally be combined with the subject matter of Examples 1 through 7, to optionally include the plurality of inclusion factors comprising at least two of: a sharpness quality of an image; an exposure quality of an image; a quantity of human beings in an image; an importance of a human being in an image; or a geographic location associated with an image.

Example 9 may include, or may optionally be combined with the subject matter of Examples 1 through 8, to optionally include instructions to generate a map depicting a location associated with the plurality of images included in the highlight collection.

Example 10 may include, or may optionally be combined with the subject matter of Examples 1 through 9, to optionally include wherein the instruction to generate the highlight collection include instructions to acquire multimedia content, associated with the subset of the plurality of images, from a database.

Example 11 may include or can optionally be combined with the subject matter of Example 10, to optionally include wherein the database is a photo or video repository.

Example 12 may include or may optionally be combined with the subject matter of Examples 1 through 9, to optionally include the criteria comprising a threshold number of images for inclusion in the highlight collection.

Example 13 may include or may optionally be combined with the subject matter of Examples 1 through 9, to optionally include the criteria comprising a percentage of images for inclusion in the highlight collection.

Example 14 may include or may optionally be combined with the subject matter of Examples 1 through 9, to optionally include instructions to provide a user interface to accept input from a user indicating a value of the criteria.

Example 15 may include subject matter (such as an apparatus, a method, a means for performing acts, or a machine-readable medium including instructions that, when performed by the machine, that may cause the machine to perform acts), such as may include a method for automatic creation of a highlight collection by a computer system comprising: receiving a plurality of images at the computer system; inspecting each one of the plurality of images with the computer system for a plurality of inclusion factors; determining a score for each one of the plurality of images based on the plurality of inclusion factors by the computer system; ranking the plurality of images according to the score determined by the computer system for each one of the plurality of images; and generating the highlight collection including a subset of the plurality of images based on a criteria associated with the ranking of the plurality of images.

Example 16 may include or may optionally be combined with the subject matter of Example 15, to optionally include determining an identity of at least one human being in at least one of the plurality of images.

Example 17 may include or may optionally be combined with the subject matter of Examples 15 or 16, to optionally include evaluating a level of importance of the at least one human being identified in the at least one of the plurality of images.

Example 18 may include or may optionally be combined with the subject matter of Examples 15 through 17, to optionally include wherein the level of importance is based on a presence of the identified human being in a local database of images or a social network, the social network being coupled to the computer system.

Example 19 may include or may optionally be combined with the subject matter of Examples 15 through 18, to optionally include wherein the level of importance is based on a frequency with which the identified human being appears in the plurality of images.

Example 20 may include or may optionally be combined with the subject matter of Examples 15 through 19, to optionally include providing a user interface on the computer system to accept input from a user indicating the priority of the plurality of inclusion factors.

Example 21 may include or may optionally be combined with the subject matter of Examples 15 through 20, to optionally include the plurality of inclusion factors comprising at least two of: a sharpness quality of an image; an exposure quality of an image; a presence of a human being in an image; a presence of an animal in an image; a quantity of human beings in an image; an importance of a human being in an image; a geographic location depicted in the image; a geographic location data embedded in an image; or an image metadata value.

Example 22 may include or may optionally be combined with the subject matter of Examples 15 through 21, to optionally include the plurality of inclusion factors comprising at least two of: a sharpness quality of an image; an exposure quality of an image; a quantity of human beings in an image; an importance of a human being in an image; or a geographic location associated with an image.

Example 23 may include or may optionally be combined with the subject matter of Examples 15 through 22, to optionally include generating a map depicting a location associated with each one of the plurality of images included in the highlight collection.

Example 24 may include or may optionally be combined with the subject matter of Examples 15 through 23, to optionally include wherein generating the highlight collection includes acquiring multimedia content, associated with the subset of the plurality of images, from a database.

Example 25 may include or may optionally be combined with the subject matter of Examples 15 through 24, to optionally include wherein the database is a photo or video repository coupled to the computer system.

Example 26 may include or may optionally be combined with the subject matter of Examples 15 through 25, to optionally include the criteria comprising a threshold number of images for inclusion in the highlight collection.

Example 27 may include or may optionally be combined with the subject matter of Examples 15 through 26, to optionally include the criteria comprising a percentage of images for inclusion in the highlight collection.

Example 28 may include or may optionally be combined with the subject matter of Examples 15 through 27, to optionally include providing a user interface to accept input from a user indicating a value of the criteria.

Example 29 may include subject matter (such as an apparatus, a method, a means for performing acts, or a machine-readable medium including instructions that, when performed by the machine, that may cause the machine to perform acts), such as may include at least one machine-readable medium comprising a plurality of instructions that in response to being executed on a computing device, cause the computing device to carry out a method according to any one of Examples 15 to 28.

Example 30 may include subject matter (such as an apparatus, a method, a means for performing acts, or a machine-readable medium including instructions that, when performed by the machine, that may cause the machine to perform acts), such as may include an apparatus for generating a highlight collection comprising a plurality of images, configured to perform the method of any one of the Examples 15 to 28.

Example 31 may include subject matter (such as an apparatus, a method, a means for performing acts, or a machine-readable medium including instructions that, when performed by the machine, that may cause the machine to perform acts), such as may include an automatic highlight collection creation system comprising: a first processor configured to receive a plurality of images from an image capture device, the first processor being configured to inspect each one of the plurality of images based on a plurality of inclusion factors and determine a score for each one of the plurality of images based on the plurality of inclusion factors; a second processor configured to receive a subset of the plurality of images based on a criteria associated with a ranking of the plurality of images according to the score determined for each one of the plurality of images, and generate the highlight collection; and a network coupled to the first processor and the second processor.

Example 32 may include or may optionally be combined with the subject matter of Example 31, to optionally include the plurality of inclusion factors comprising: a sharpness quality of an image; an exposure quality of an image; a presence of a human being in an image; a presence of an animal in an image; a quantity of human beings in an image; an importance of a human being in an image; a geographic location depicted in the image; a geographic location data embedded in an image; or an image metadata value.

Example 33 may include or may optionally be combined with the subject matter of Examples 31 or 32, to optionally include the plurality of inclusion factors comprising: a sharpness quality of an image; an exposure quality of an image; a quantity of human beings in an image; an importance of a human being in an image; and a geographic location associated with an image.

Example 34 may include or may optionally be combined with the subject matter of Examples 31, 32 or 33, to optionally include wherein the first or second processor is configured to determine an identity of at least one human being in at least one of the plurality of images.

Example 35 may include or may optionally be combined with the subject matter of Examples 31 through 34, to optionally include a social network coupled to the network; wherein the first processor is configured to access the social network to determine an importance of an identified individual in at least one of the plurality of images.

Example 36 may include or may optionally be combined with the subject matter of Examples 31 through 35, to optionally include wherein the first processor is configured to: evaluate a level of importance of the at least one human being identified in the at least one of the plurality of images.

Example 37 may include or may optionally be combined with the subject matter of Examples 31 through 36, to optionally include wherein the level of importance is based on a frequency with which the identified human being appears in the plurality of images.

Example 38 may include or may optionally be combined with the subject matter of Examples 31 through 37, to optionally include an image database coupled to the network; wherein the first processor is configured to access the image database to acquire images associated with the subset of the plurality of images.

Example 39 may include or may optionally be combined with the subject matter of Examples 31 through 38, to optionally include wherein the second processor is configured to generate a map depicting a location associated with each one of the plurality of images included in the highlight collection.

Example 40 may include or may optionally be combined with the subject matter of Examples 31 through 39, to optionally include a local image database including a plurality of images; wherein the first processor is configured to access the image database to determine an importance of an identified individual in at least one of the plurality of images.

What is claimed is:

1. At least one non-transitory machine-readable medium comprising a plurality of instructions that in response to being executed on a computing device, cause the computing device to:
    receive a plurality of images;
    present a user interface, the user interface including a plurality of inclusion factors, the inclusion factors including the presence or importance of a human being;
    receive a criteria, via the user interface, prioritizing at least one of the plurality of inclusion factors;
    inspect each one of the plurality of images for the plurality of inclusion factors;
    determine an identity of at least one human being in at least one of the plurality of images;
    evaluate a level of importance of the at least one human being identified in the at least one of the plurality of images based at least in part on data obtained from a social networking system coupled to the computing device;
    determine a score for each one of the plurality of images based on the inspection of the images for the plurality of inclusion factors;
    rank the plurality of images according to the score determined for each one of the plurality of images; and
    generate a highlight collection including a subset of the plurality of images based on the criteria prioritizing the plurality of images.

2. The at least one non-transitory machine-readable medium as recited in claim 1, wherein the level of importance is based on a presence of the identified human being in a local database of images.

3. The at least one non-transitory machine-readable medium as recited in claim 1, wherein the level of importance is based on a frequency with which the identified human being appears in the plurality of images.

4. The at least one non-transitory machine-readable medium as recited in claim 1, the plurality of inclusion factors comprising at least two of:
   a sharpness quality of an image; an exposure quality of an image; a presence of an animal in an image; a quantity of human beings in an image; an importance of a human being in an image; a geographic location depicted in the image; a geographic location data embedded in an image; a geographic location associated with an image; or an image metadata value.

5. The at least one non-transitory machine-readable medium as recited in claim 1, wherein the instruction to generate the highlight collection include instructions to acquire multimedia content, associated with the subset of the plurality of images, from a database.

6. The at least one non-transitory machine-readable medium as recited in claim 1, the criteria comprising:
   a threshold number of images for inclusion in the highlight collection, or
   a percentage of images for inclusion in the highlight collection.

7. A method for automatic creation of a highlight collection by a computer system comprising:
   receiving a plurality of images at the computer system;
   presenting a user interface, the user interface including a plurality of inclusion factors, the inclusion factors including a presence or importance of a human being;
   receiving a criteria, via the user interface, prioritizing at least one of the plurality of inclusion factors;
   inspecting each one of the plurality of images with the computer system for the plurality of inclusion factors;
   determining an identity of at least one human being in at least one of the plurality of images;
   evaluating a level of importance of the at least one human being identified in the at least one of the plurality of images based at least in part on data obtained from a social networking system coupled to the computer system;
   determining a score for each one of the plurality of images based on the inspection of the images for the plurality of inclusion factors by the computer system;
   ranking the plurality of images according to the score determined by the computer system for each one of the plurality of images; and
   generating the highlight collection including a subset of the plurality of images based on the criteria prioritizing the plurality of images.

8. The method of claim 7, wherein the level of importance is based on a presence of the identified human being in a local database of images or the data from the social network.

9. The method of claim 8, wherein the level of importance is based on a frequency with which the identified human being appears in the plurality of images.

10. The method of claim 7, the plurality of inclusion factors comprising at least two of:
    a sharpness quality of an image; an exposure quality of an image; a presence of an animal in an image; a quantity of human beings in an image; an importance of a human being in an image; a geographic location depicted in the image; a geographic location data embedded in an image; a geographic location associated with an image; or an image metadata value.

11. The method of claim 7, comprising:
    generating a map depicting a location associated with each one of the plurality of images included in the highlight collection.

12. The method of claim 7, wherein generating the highlight collection includes acquiring multimedia content, associated with the subset of the plurality of images, from a database that includes a photo or video repository.

13. The method of claim 8, the criteria comprising:
    a threshold number of images for inclusion in the highlight collection, or
    a percentage of images for inclusion in the highlight collection.

14. An automatic highlight collection creation system comprising:
    a first processor configured to receive a plurality of images from an image capture device, the first processor being configured to receive a criteria, via a user interface, prioritizing at least one of the plurality of inclusion factors, the inclusion factors including a presence or importance of a human being; determine an identity of at least one human being in at least one of the plurality of images; access a social network to determine an importance of an identified individual in at least one of the plurality of images; and inspect each one of the plurality of images based for the plurality of inclusion factors, and determine a score for each one of the plurality of images based on the inspection of the images for the plurality of inclusion factors;
    a second processor configured to receive a subset of the plurality of images, and generate a highlight collection based on the criteria prioritizing at least one of the plurality of inclusion factors, and the score determined for each one of the plurality of images; and
    a network coupled to the first processor and the second processor.

15. The system of claim 14, the plurality of inclusion factors comprising:
    a sharpness quality of an image; an exposure quality of an image; a presence of an animal in an image; a quantity of human beings in an image; an importance of a human being in an image; a geographic location depicted in the image; a geographic location data embedded in an image; a geographic location associated with an image; or an image metadata value.

16. The system of claim 14, wherein
    the level of importance is based on a frequency with which the identified human being appears in the plurality of images.

17. The system of claim 14, wherein the second processor is configured to generate a map depicting a location associated with each one of the plurality of images included in the highlight collection.

18. The system of claim 14, comprising:
    an image database including a plurality of images;
    wherein the first processor is configured to access the image database to determine an importance of an identified individual in at least one of the plurality of images.

* * * * *